A. W. THOMPSON.
REGULATING APPARATUS.
APPLICATION FILED MAR. 26, 1915.

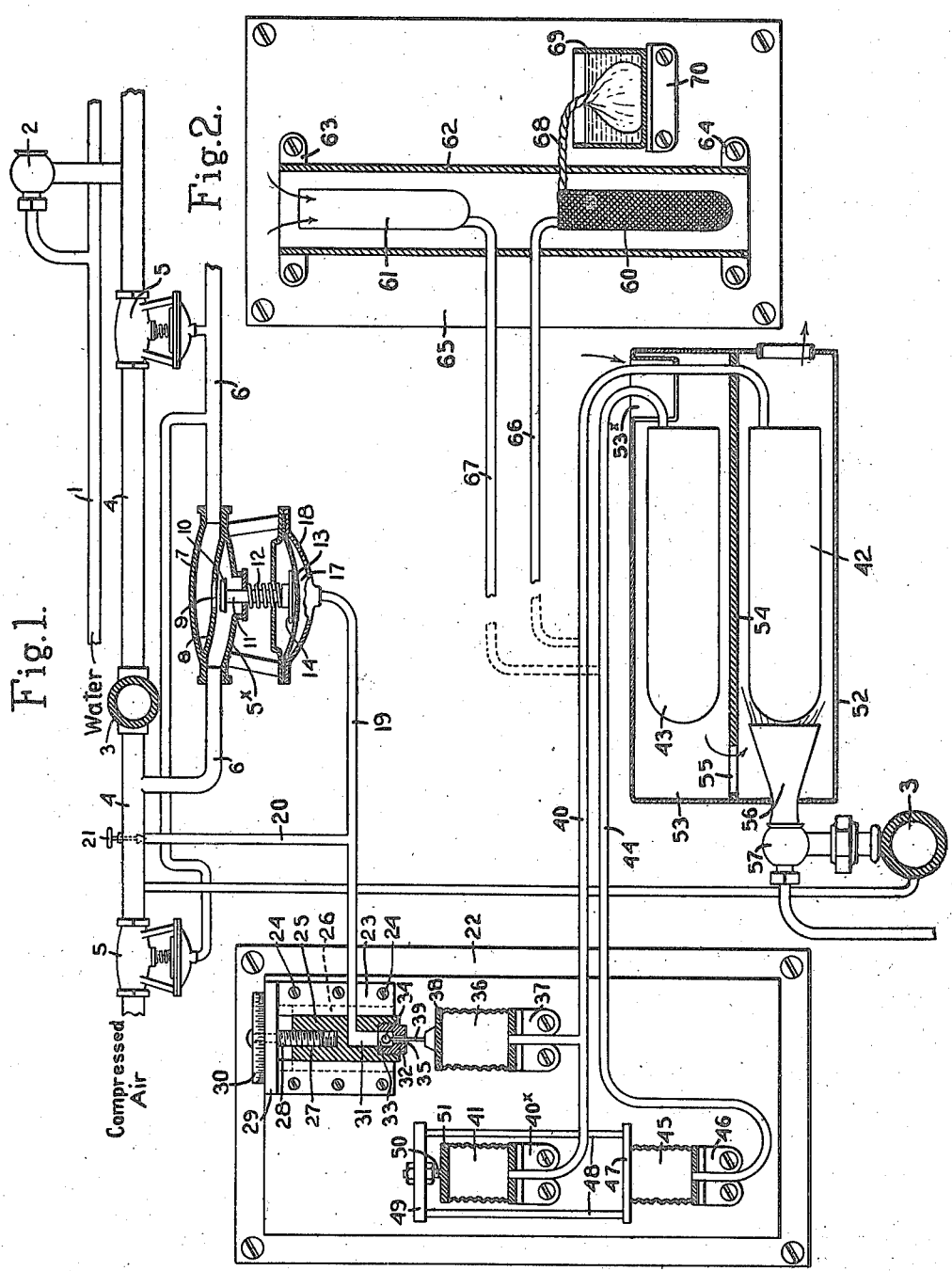

1,263,484.

Patented Apr. 23, 1918.
2 SHEETS—SHEET 2.

Fig. 3.

Inventor.
Albert W. Thompson,
by Heard Smith & Tennant.
Atty's.

UNITED STATES PATENT OFFICE.

ALBERT W. THOMPSON, OF FITCHBURG, MASSACHUSETTS, ASSIGNOR TO THE G. M. PARKS COMPANY, OF FITCHBURG, MASSACHUSETTS, A CORPORATION OF MASSACHUSETTS.

REGULATING APPARATUS.

1,263,484.   Specification of Letters Patent.   Patented Apr. 23, 1918.

Application filed March 26, 1915. Serial No. 17,298.

*To all whom it may concern:*

Be it known that I, ALBERT W. THOMPSON, a citizen of the United States, and a resident of Fitchburg, county of Worcester, State of Massachusetts, have invented an Improvement in Regulating Apparatus, of which the following description, in connection with the accompanying drawing, is a specification, like characters on the drawing representing like parts.

This invention relates to regulating apparatus operable by the difference in temperature of elements exposed to different conditions of atmospheric temperature and is disclosed herein as applied to the regulation of the atmospheric humidity and the temperature of a room. It is however obvious that the regulating mechanism may be utilized to control other devices than humidifying and heating mechanisms or systems such as ventilating mechanisms, etc.

Most of the controlling apparatus heretofore devised are of complex construction involving the use of delicate and sensitive parts for transmitting and multiplying extremely small movements due to the expansion of certain solid materials. In other types of controlling apparatus, use is made of the expansion of fluids exposed to different temperatures and operating either under varying or opposing pressures, or through mechanical transmission by means of levers, gearing, etc.

All of these devices must be of delicate and costly construction to secure reasonable accuracy, and they are exposed to great risk of damage and faulty operation by reason of the extreme delicacy and complexity of their construction. For the same reason their initial adjustment and calibration is difficult, requiring great care, precision and expense.

My invention avoids the use of delicate transmission levers, gearing, etc., and requires the use only of expansion members such as bellows or diaphragms in conjunction with suitable receptacles containing expansible fluids, certain types of which have been in commercial use for many years. I thus secure greater simplicity, durability and accuracy in construction and operation combined with ease of adjustment.

The apparatus is simple and compact and the risk of injury or disarrangement from jar, vibration or other disturbing influences which frequently occur under working conditions is reduced to a minimum.

The drawing illustrates a preferred embodiment of my invention as applied to the regulation of a humidifying apparatus of a well known type and also to the regulation of the heat supplied to the room being treated.

Figure 1 of the drawing is an elevation of the regulating mechanism as applied to a humidifying apparatus, parts of the regulating mechanism being shown in section.

Fig. 2 is a detail sectional view of a modified form of exposure mechanism indicating in dotted lines the manner in which it is preferably connected with the other members of the regulating apparatus.

Fig. 3 is a view showing the regulating apparatus as applied both to a humidifying system and to means for regulating a heating system.

The invention is illustrated in Fig. 1 as applied only to a humidifying system in which water is vaporized by compressed air and delivered directly to the room and in Fig. 3 as also embodying means for regulating a steam heating system for the room.

The humidifying system comprises the main water supply pipe 1 having vertical branches or stand pipes connected to humidifying heads 2, preferably of the "turbo" type disclosed in my prior Patent No. 965,963, granted Aug. 2, 1910, the water in the branch pipes being maintained substantially at the level of the axial plane of the turbo heads. The water is drawn into the heads by inspiration and is vaporized by a fluid under pressure, preferably compressed air, delivered tangentially within the "turbo heads" 2 so that jets of spray will play as long as the supply of fluid under pressure is maintained and will cease immediately when the supply thereof is cut off.

The fluid under pressure is supplied to the "turbo heads" through a suitable main 3 to branch pipe lines 4 to each of which one or more turbo heads is connected. A suitable valve operated by fluid under pressure, preferably in the form of a diaphragm valve 5, is interposed in each branch near the main, and automatic means are provided for controlling all of the valves in the branch pipes. This automatic means desirably is a main diaphragm valve $5^x$ of the same design as those which control the branch pipes 4 and a description of one will serve as a description of all, it being understood that the diaphragm valves 5 of the branch pipes are controlled by the main regulating valve through other branch pipes 6, which preferably are of relatively small capacity.

The main diaphragm valve 5× as shown in the drawings comprises a valve casing 7 having the usual transverse partition 8 apertured to form a valve seat 9 and a reciprocating valve 10 adapted to be seated upon said valve seat. The stem 11 of the reciprocating valve is surrounded by a helical spring 12 which bears at one end upon the exterior of the valve casing and at its other end upon a suitable disk 14 which rests upon a diaphragm 13 supported in a preferably annular frame 15 connected by arms 16 with the valve bonnet. The flexible diaphragm 13 forms the upper wall of a chamber 17, the lower wall 18 of which is preferably concave in form and is provided with an inlet pipe 19 connected by a bypass 20 with the main compressed air supply. A suitable needle valve 21 is located in the branch pipe 20 to provide for the accurate adjustment of the pressure which is maintained in the chamber 17 beneath the diaphragm 13. The spring 12 tends normally to maintain the valve 10 out of contact with the valve seat 9 so that pressure is maintained normally in the ranch pipes 6 which, operating upon the diaphragm of the valves 5 which control the several humidifier heads, retain them normally closed.

The compressed air supplied to the chamber 17 beneath the diaphragm 13 is preferably controlled by a ball pilot valve the pressure being regulated by the needle valve 21 so that it is just sufficient to keep the valve 10 closed so long as the ball is seated, but if the ball is raised the escape of air through the pilot valve will lower the pressure sufficiently to permit the spring 12 to force the valve 10 from its seat, thereby permitting the compressed air to pass through the branch pipes 6 and actuate the diaphragm valves 5 to shut off the air from the humidifier heads 2.

In the apparatus disclosed herein the pilot valve, expansion members and auxiliary motor are shown as being supported upon a panel 22 of slate, wood or other suitable material, the pilot valve being supported upon a base 23 which is fastened to the panel 22 by suitable screws 24.

The pilot valve mechanism comprises a valve casing 25 adjustably mounted in suitable ways 26 in the base 23, the upper portion 27 of said casing being tapped and screw threaded axially to receive an adjusting screw 28 which is rotatably mounted in a flange or ledge 29 extending forwardly from the base plate 23. The upper end of the adjusting screw 28 desirably is provided with a relatively large disk or dial 30 graduated to correspond with the amount of depression of the wet bulb temperature required to cause the operation of the humidifier heads at different degrees of relative humidity of the atmosphere. The lower portion of the valve casing is provided with a longitudinal preferably cylindrical aperture 31 which connects at its upper end with the pipe 19 which leads to the chamber 17 beneath the diaphragm 13 of the primary motor. The lower end of the aperture 31 is enlarged and its walls screw threaded to receive a nut 32 having a central recess 33 forming a chamber for a ball 34 and is provided with an axial aperture 35 upon which the ball is seated.

The means for opening and closing the pilot valve as aforesaid comprises an auxiliary motor 36 which preferably is in the form of a "sylphon" bellows resting upon a bracket 37 immediately below the pilot valve, the upper end of said bellows being in the form of a rigid plate 38 having a fluted stem 39 attached to the central portion thereof and extending through the aperture 35 in such a manner as to engage and raise the ball 34 when the bellows is expanded.

The auxiliary motor 36 is arranged to be actuated by the differential expansion of the fluid contained in two fluid systems containing expansion members which are connected respectively with wet and dry bulb exposure elements, one of which is subjected to the influence of the atmospheric temperature of the air of the room, and the other of which is subjected to the psychrometric or hygrometric wet bulb temperature thereof.

In the preferred embodiment of the invention disclosed herein the auxiliary motor 36 is fluidly connected through a pipe 40 with a compensating fluid expansion member 41, preferably a "sylphon" bellows, which rests upon a bracket 40× suitably secured to the panel 22. The compensating member is connected mechanically or otherwise with a wet bulb exposure element 42, which preferably is in the form of a metallic cylinder the surface of which is adapted to be maintained continuously moist by means which will hereinafter be described.

The auxiliary motor 36, the expansion member 41, the wet bulb exposure element 42, and their connecting tube 40 are filled with a fluid having a high coefficient of expansion and hermetically sealed. It will therefore be obvious that variations in temperature of the wet bulb exposure element will cause corresponding variations in the volume of the fluid contained in the fluid system causing the bellow 36 or 41 or both to expand as the temperature rises and to contract as the temperature falls.

The dry bulb exposure element 43 is a metallic tube of equal volume with the wet bulb exposure element 42, and is connected by a tube 44 with an expansion member 45 which is equal in cross sectional area and capacity to the expansion member 41 of the wet bulb system. The dry bulb expansion member 45 is likewise a sylphon bellows and desirably is mounted upon a bracket 46 immediately beneath the bracket 40×.

In order that the auxiliary motor 36 may be influenced only by the differential expansion of the fluids in the wet and dry bulb systems the upper head 47 of the expansion member 45 is connected by rods 48 with the cross head 49 which is rigidly connected by a bolt 50 with a head 51 of the expansion member or bellows 41. By reason of this construction it will be obvious that the heads 47 and 50 of the expansion members or bellows 41 and 45 must move in unison and equally at all times and that the auxiliary motor 36 will be influenced only when there occurs a change in the relative fluid volumes of the fluids in the wet and dry systems. The cross sectional area of the motor 36 preferably is the same as that of the expansion members 41 and 45 although this is not an essential requirement.

The wet and dry bulb exposure elements, as before stated, are preferably metallic cylinders of equal size and capacity and any suitable arrangement may be made for subjecting them respectively to the influence of the temperature of the atmosphere of the room and psychrometric or hygrometric wet bulb temperature thereof.

In the preferred embodiment of the invention illustrated in Figs. 1 and 3 the wet and dry bulb elements are suitably supported in two adjacent chambers 52 and 53 which are separated by a partition 54 of substantially non-conducting material. The chamber 53, which incloses the dry bulb exposure element is provided at its upper portion adjacent the rear end with an aperture 53× which constitutes an admission port through which the atmosphere of the room may enter and surround said dry bulb element. The chamber 53 desirably may connect at its forward end with the chamber 52 through a suitable aperture 55. A spray of water may be continuously supplied to the wet bulb exposure element 42 through the nozzle 56 of an auxiliary "turbo" head 57, or other suitable water spraying device. The jet of spray in such case will serve not only to maintain the wet bulb element at the psychrometric wet bulb temperature but will also induce a current of air through the admission port 54, the chamber 53, the aperture 55 and the chamber 52 so that both the dry and wet bulb elements will be subjected to the influence of the same sample of atmosphere of the room but under different hygrometric conditions: the first or dry bulb member being subjected to the atmospheric temperature of the room, and the second or wet bulb element to the psychrometric wet bulb temperature thereof.

The same result may be obtained by the use of the hygrometric wet bulb temperature of the atmosphere by substituting for the jet which plays upon the wet bulb element 42 a jacket of muslin or other material which is maintained continuously moist.

In Fig. 2 I have illustrated such a construction, indicating in dotted lines how the same may be connected to the regulating apparatus aforesaid.

In this construction the wet and dry bulb exposure elements 60 and 61 are desirably supported within a vertical tube 62 which may be supported by suitable brackets 63—64 upon a panel 65, the wet bulb exposure element 60 being connected by a tube 66 with the tube of the wet bulb system aforesaid and the dry bulb exposure element 61 being connected by a tube 67 with the tube 40 of said dry bulb system. The wet bulb member 60 is provided with a jacket or a sheath of muslin 68 having an extension or wick leading through the side of the tube and immersed in the water contained in a suitable receptacle 69 which may be conveniently supported upon a bracket 70 upon the panel 65. In this construction the tube 62 is freely open at both ends, and in operation the atmosphere of the room will descend by gravitation so that the same sample of atmosphere will pass first the dry bulb member and descending farther will envelop the moistened fabric coated wet bulb member, finally being discharged at the lower end of the tube.

In both of the systems above described it is desirable that the metallic exposure members shall be of substantially equal size and volume and connected respectively with expansion members of equal cross sectional area and equal volume so that equal changes in volume in both systems will be absorbed by the then necessarily equal movements of the mechanically connected expansion members without disturbance of the motor. The sectional area and the volume of the auxiliary motor 36 relative to that of the expansion members 41 and 45 is not a fixed requirement although preferably the auxiliary motor should be of the same size and capacity.

To maintain any desired per cent. of relative humidity the proper adjustment of the ball relative to the end of the spindle may be made by actuating the humidifiers until the room is brought to the desired condition, which may be determined by a hygrometer and then lowering the pilot valve until the spindle 39 contacts with the ball 34 and raises it from its seat, thus permitting the escape of air through the flutes on the spindle, and, by the operation of the diaphragm valves previously described shutting off the humidifier heads.

As soon as the moisture of the room is sufficiently dissipated to cause an increase in the wet bulb depression the contraction of the auxiliary motor 36 and the lowering of the spindle will reseat the valve, starting up the humidifiers and causing the same to operate until stopped by another expansion of the auxiliary motor 36.

Under working conditions the operation of the device is as follows: Assuming that the fluid in the dry bulb exposure element 43 is at a certain temperature (T$d$) and that the fluid in the wet bulb expansion element 42 is at a lower temperature (T$w$) the difference (T$d$—T$w$) corresponding to a certain relative humidity, and that a small rise in temperature takes place, the relative humidity meanwhile remaining constant, the wet bulb depression (T$d$—T$w$) will also remain substantially constant, since it is a fact that through small ranges in temperature the relative humidity bears a fixed relation to the wet bulb depression. This being the case, both exposure elements will experience a like change in temperature and equal increases in volume of the contents of the two exposure members, due to expansion, will take place, resulting in the expansion of the members 41 and 45 against the constant external atmospheric pressure. Since the wet bulb expansion member 41 is forced by its construction to extend to an amount equal to the expansion of the dry bulb expansion member 45, it is clear that there will be no movement of the auxiliary motor 36, which being also under external atmospheric pressure cannot change its position unless the change in the volume of fluid contained in the wet bulb system is either greater or less than the change in volume of the fluid in the dry bulb system; conversely it is clear that, if the temperature of the air in the room is lowered with the relative humidity constant the expansion members 41 and 45 will contract in like amounts and the auxiliary motor 36 will remain stationary.

Now, if the dry bulb temperature remains constant, and the relative humidity falls, the wet bulb temperature will be lowered and the fluid in the wet bulb system will contract in volume. Since there is no change in the volume of the fluid in the dry bulb system, the expansion member 45 will remain stationary and being mechanically connected to the expansion member 41 will cause that member likewise to remain stationary so that the influence of the contracting fluid in the wet bulb system will cause the bellows which constitutes the auxiliary motor 36 to contract under exterior atmospheric pressure by an amount proportional to the change in volume of the wet bulb system, thus withdrawing the spindle 39 from the ball 30 and permitting the latter to rest upon its seat, closing the pilot valve and consequently actuating the diaphragm 13 to close the valve in the auxiliary supply pipe, which in turn permits the valves controlling the humidifier heads to open and discharge a spray into the room until the relative humidity is raised to the predetermined amount.

If the temperature of the air in the room be increased without addition of moisture the wet bulb temperature will remain constant since the dewpoint, which is constant for a given absolute humidity, will not change. This condition like the last preceding, represents an increase in the wet bulb depression and the resultant movement of the motor 36 will be similar, for, although no change in tempertaure or volume takes place in the fluid in the wet bulb system, the expansion due to the increase in temperature and volume in the dry bulb system causes an expansion in the dry bulb expansion member accompanied by an equal expansion in the wet bulb expansion member 41, which is rigidly connected to it and the auxiliary motor 36 will consequently contract in like amount. It is therefore clear that an increase in the wet bulb depression due to lowered relative humidity will cause a corresponding contraction in the axuiliary motor 36; and conversely, a decrease in the wet bulb depression due to an increase of relative humidity will cause a corresponding expansion of the auxiliary motor 36.

By increasing the volume of the exposure elements relative to the cross sectional areas of the expansion members 41 and 45 and the auxiliary motor 36, any desired degree of accuracy may be obtained and the disk 30 may be calibrated and graduated to indicate closely the setting for any desired per cent. of relative humidity.

While the embodiment of the invention is disclosed herein as applied to a system in which a plurality of spray or "turbo" heads is used, it is obvious that the same may be adapted for use with a single turbo head in which case the diaphragm motor will be arranged with the spring acting normally to seat the valve. The same result may also be obtained if the wet and dry bulb members be reversed and the first or relay diaphragm valve be omitted, the pilot valve being connected directly with the diaphragm valves which control the humidifying systems. Furthermore it is to be understood that other confined fluid exposure elements of various types may be utilized within the scope of my invention whether the same are operable by relative changes in temperature, pressure, or volume of the fluid in the different fluid systems, for example, collapsible bellows such as sylphon bellows may be substituted for the two exposure elements and if these be then subjected to variable pressures the apparatus could be used as a means to regulate the differences between such variable pressures, the device thus becoming a differential pressure regulator.

While I have described my invention as applied to the regulation of a fluid under pressure adapted to vaporize water through spray heads, it will be obvious that it may be applied with equally good results to control water supply valves, air admission ports, valves of a heating system, the speed of fans or other distributing devices.

It may therefore be used to regulate any type of humidifying apparatus whether the regulation is to be accomplished by changing the supply of moisture delivered to a room or by changing the amount of air introduced or the heat supplied or any other means whereby the relative humidity of the room is affected.

In Fig. 3 of the drawing I have illustrated this invention as applied to the regulation both of a humidifying system and also a system for supplying heat to the room. For convenience in illustration the regulating mechanism is shown as operating the valve of a steam heating system leading to radiators or other heat distributing units. It is to be understood however that the mechanism may be adapted to regulate dampers or other types of valves with equal facility or may be used to control the amount of air supplied to the room as well as its condition with respect to heat or moisture. The portion of the construction illustrated in Fig. 3 which controls the humidifier system is identical with that shown in Fig. 1 heretofore described. In addition thereto I have provided a supplemental regulator operated by the expansion and contraction of the dry bulb fluid system for the purpose of regulating the steam heating system.

Steam is supplied to the steam heating system through a pipe 75 preferably governed by a diaphragm valve 76 which may be similar in all respects to the diaphragm valves 5 and 5<sup>x</sup>, the head 77 of this diaphragm valve is normally maintained seated against the action of the spring 78 by the pressure in the chamber 79 upon the diaphragm 80, this pressure being supplied from the main compressed air pipe 3 or branch pipe 4 through supplemental pipes 81, 82. A diaphragm valve 83, which also may be of the same character as the valves 5 and 5<sup>x</sup>, aforesaid is interposed in the pipe 81 in such a manner as to control the pressure in the chamber 79 of the valve 76.

As illustrated herein a branch pipe 84 leads from the main 3 to the chamber 85 beneath the diaphragm 86 so that when pressure is supplied through the pipe 84 to the chamber 85 the valve 87 will be seated and the supply of compressed air through the pipes 81—82 cut off, thereby permitting the head 77 of the valve 76 to be raised so that steam will be supplied to the heating system. The valve 83 like the valve 5<sup>x</sup> desirably may be controlled through a pilot valve connected with it and similar in many respects to that which controls the valve 5<sup>x</sup>, the ball of said pilot valve being raised and lowered through a stem carried by the cross head 49 of the compensating member aforesaid. This pilot valve like the pilot valve for regulating the humidifying system may comprise a base 88 supported upon the panel 22 by suitable screws and having ways 89 adjustably to support a valve casing 90 having its upper portion tapped to receive an adjusting screw 91 extending through a flange 92 and provided with a graduated disk or head 93. The lower portion of the valve casing 90 is provided with a nut 95 having a ball chamber and an axial aperture to receive a fluted stem 96 carried by the cross head 49. The ball 97 is adapted to close the axial opening of the nut 95 when the bellows 41 and 45 are contracted, but when they are expanded the stem 96 will be thrust far enough through the axial aperture 95 to unseat the ball thereby releasing the pressure from beneath the diaphragm 86 of the valve 83 permitting the valve head 87 to descend, thus opening the valve 83 and permitting the compressed air to pass through the pipes 81 and 82 and seating the valve head 77 thereby shutting off the steam.

It will be observed that the operation of the pilot valve which controls the heating system is caused wholly by the expansion of the expansion member 45. This is due to the raising and lowering of the temperature of the fluid in the dry bulb exposure element independent of the expansion and contraction of the fluid in the wet bulb member which is at all times dependent only upon the psychrometric of hygrometric wet bulb temperature of the atmosphere. It is therefore clear that changes in the dry bulb temperature causing expansion or contraction of the bellows 45 will cause like movement in the cross head 49, and the stem 96 which is rigidly connected to the cross head 49 will actuate the ball 97 of the pilot valve in the manner aforesaid.

By adjusting the graduated head 93 of the adjusting screw 91 therefore, the amount of heat supplied to the room may be accurately controlled so that a substantially uniform predetermined dry bulb temperature may be maintained.

It will be remembered that the amount of moisture supplied to the room is regulated by the differential expansion of the fluids in the wet and dry bulb systems so that in the apparatus thus described the expansion of the fluid in the dry bulb system independent of the action of the fluid in the wet bulb system will serve to regulate the temperature of the room; and the differential expansion of the fluids in the wet and dry bulb systems due to changes in relative humidity will serve to control the amount of moisture supplied to the room irrespective of the setting of the temperature control and thereby to maintain constant the relative humidity of the atmosphere.

This combined action of the regulating mechanisms is very important since in mills in which high grade yarns and cloth are manufactured and in many other concerns it is very desirable to maintain the room in which the work is being done at a certain uniform temperature and also to maintain the atmosphere at a fixed relative humidity.

Furthermore this desirable regulation is economical of fuel and also is conducive to the comfort of the operatives, tending to prevent the waste of fuel in preventing unnecessarily high temperatures and consequent discomfort.

While I have illustrated this regulating mechanism as operating a steam heating system it will be obvious that the same may be used to regulate any other kind of heating system or a ventilating system or other mechanism which desirably may be controlled by the temperature of the room.

Having thus described my invention what I claim as new and desire to secure by Letters Patent is:

1. A regulator comprising two fluid containing elements adapted to be exposed to different temperatures and each fluidly connected to an expansion member; said expansion members being coördinated to expand equally for the same rise in temperature of said elements, each absorbing equal volumes of fluid; a third expansion member fluidly connected with one of the fluid containing members and adapted to expand or contract with a movement proportional to any change in the difference of volume in the two fluid systems.

2. A regulator comprising two fluid containing elements adapted to be exposed to the influence of different temperatures; means fluidly connected with the fluid in one of said fluid containing elements and correlated with said fluid containing elements to produce motion in direct proportion to the changes in the difference in temperature of said fluid containing elements.

3. A regulator comprising two fluid containing elements adapted to be exposed to the influence of different temperatures; means fluidly connected with the fluid in one of said fluid containing elements and volumetrically correlated with said fluid containing element to produce motion in direct proportion to the changes in difference in volume of the fluid in said fluid containing elements.

4. A regulator comprising two fluid containing elements adapted to be exposed to the influence of different temperature conditions, expansion members fluidly connected to each of said fluid containing elements and mechanically connected together and a motor connected to one of said expansion members adapted to be actuated by the changes in relative volume of the fluids in said expansion members.

5. A regulator comprising a fluid containing receptacle adapted to be exposed to changes in temperature, an expansion chamber fluidly connected therewith to provide for changes in fluid volume, a second like fluid containing receptacle also adapted to exposure in changes of temperature, a like expansion member fluidly connected therewith and also with an expansion motor, means rigidly connecting the two expansion members to compel the second to expand in unison with the first, whereby any change in the difference in volume of the two fluid bodies will produce a movement of the motor directly proportional thereto.

6. A regulator comprising two receptacles containing expansible fluids and adapted to be exposed to the influence of the same medium, under different hygrometric conditions, a motor fluidly connected to one receptacle and compensating means fluidly connected with both receptacles adapted to cause in the motor changes proportional to the difference in temperature of said receptacles.

7. A regulator comprising two receptacles containing expansible fluids adapted to be exposed to the influence of different temperature conditions, an expansion motor operatively connected to one of said receptacles, compensating mechanism connecting the two receptacles adapted to cause an expansion of the motor proportional to the difference in temperature of the two exposed receptacles.

8. A regulator comprising two fluid systems, one of which consists of a dry bulb exposure member fluidly connected to an expansion bellows, the other of which comprises a wet bulb exposure member fluidly connected to an expansion bellows and to an expansion motor, means for maintaining the wet bulb member continuously moist, means connecting said expansion bellows whereby the expansion motor will be actuated by changes in difference in volume of the fluids in the wet and dry bulb systems, and means actuated by the expansion of the motor to control the regulating mechanism.

9. A regulator comprising a valve operable by a fluid under pressure, and means for supplying fluid under pressure thereto, a ball pilot valve for controlling the pressure of said fluid; a fluid expansion motor located beneath said ball valve and having a spindle adapted to engage the ball to unseat the same, a fluid containing receptacle constituting an exposure element fluidly connected to said motor, a second fluid containing receptacle adapted to be exposed to a different hygrometric condition of the atmosphere, expansible compensating means fluidly connected to said receptacles and said motor whereby changes in the difference in temperature between said receptacles due to changes in relative humidity will cause the actuation of the expansion motor to open or close the pilot valve.

10. A regulator comprising two fluid systems, one having a fluid containing element exposed to the temperature of a sample of the atmosphere of the room, the other having a like fluid containing element exposed to the action of the same sample of air, under different hygrometric conditions, an expansion motor fluidly connected with one of said exposure elements, and compensating means fluidly connected to said exposure elements and to said motor adapted to actuate the motor in proportion to the increase or decrease in the difference in temperature of the exposure elements due to changes in the relative humidity of the atmosphere.

11. A humidity regulator comprising a valve operable by a fluid under pressure, means for supplying fluid under pressure thereto, a ball pilot valve for regulating the supply of air to said regulating valve, an expansion motor operatively positioned beneath said ball and having a stem adapted upon the expansion of said motor to unseat the ball, a wet bulb exposure element fluidly connected with said motor, means for maintaining said exposure element constantly moist, a dry bulb exposure element subjected to the atmospheric temperature of the room, a "sylphon" bellows fluidly connected therewith, a second "sylphon" bellows mechanically connected to the first mentioned "sylphon" bellows and fluidly connected to said expansion motor whereby the difference of expansion in the wet and dry systems will actuate said motor to open and close the pilot valve.

12. A combined temperature and relative humidity regulator comprising a fluid containing element adapted to be exposed to the dry bulb temperature of an inclosure, a motor fluidly connected thereto and adapted to move in proportion to the changes in dry bulb temperature, a second fluid containing element adapted for exposure to the wet bulb temperature of said inclosure and a second motor fluidly connected thereto; means connecting said motors whereby the movement of the second motor will be proportional to the changes in wet bulb depression, means actuated by the movement of the first motor to regulate the supply of heat to the inclosure and means actuated by the movement of the second motor to regulate the supply of moisture to the atmosphere of the inclosure.

13. In an apparatus for regulating the temperature and relative humidity of the atmosphere of an inclosure comprising heat supplying means and moisture supplying means; a plurality of fluid expansion systems having members adapted to be exposed respectively to the wet and dry bulb temperature of said atmosphere, expansion members fluidly connected respectively to said exposure members, means mechanically connecting said expansion members whereby said expansion members will expand and contract equally, means operated by the expansion and contraction of said expansion members to regulate the heat supplied to the inclosure and means operable by the differential expansion of the fluids in said systems to regulate the amount of moisture supplied to the inclosure.

14. In an apparatus for regulating the temperature and relative humidity of the atmosphere of an inclosure comprising heat supplying means and moisture supplying means, a plurality of coöperating fluid expansion systems having elements adapted to be exposed respectively to the wet and dry bulb temperature of the atmosphere of said inclosure, expansion members fluidly connected respectively to said wet and dry bulb elements, an auxiliary motor fluidly connected to said wet bulb member, a pilot valve controlled by the dry bulb expansion member and a pilot valve controlled by said motor, and means operable by the differential expansion of said expansible members to cause said pilot valves to regulate respectively the heat supplying means and moisture supplying means.

15. In an apparatus for regulating the temperature and relative humidity of the atmosphere of an inclosure comprising a heat supplying means and a moisture supplying means, diaphragm valves for controlling said heat supplying means and said moisture supplying means, a plurality of coöperating fluid expansion systems having elements adapted to be exposed respectively to the influence of the wet and dry bulb temperatures of said atmosphere, expansion members fluidly connected to said wet and dry bulb exposure elements and mechanically connected together, an auxiliary motor fluidly connected to said wet bulb exposure element and to said wet bulb expansion member, pilot valves actuated respectively by said expansion members and said auxiliary motor to control respectively the diaphragm valves of the heat supplying means and the diaphragm valves of the moisture supplying means.

16. In an apparatus for regulating the temperature and relative humidity of the atmosphere of an inclosure comprising a heat supplying means and a moisture supplying means, diaphragm valves for controlling respectively said heat supplying means and said moisture supplying means, a plurality of coöperating fluid expansion systems having elements adapted to be exposed respectively to the influence of the wet and dry bulb temperatures of said atmosphere, expansion members fluidly connected respectively to said wet and dry bulb exposure elements and mechanically connected together, an auxiliary motor fluidly connected to said wet bulb exposure element and to said wet bulb expansion member, pilot valves actuated respectively by said dry bulb expansion member and said auxiliary motor to control respectively the diaphragm valves of the heat supplying means and the diaphragm valves of the moisture supplying means, and means for independently adjusting said pilot valves whereby a predetermined temperature and a predetermined relative humidity may be maintained.

In testimony whereof, I have signed my name to this specification.

ALBERT W. THOMPSON.